(12) United States Patent
Tanaka (10) Patent No.: US 9,796,215 B2
(45) Date of Patent: Oct. 24, 2017

(54) HEAVY DUTY PNEUMATIC TIRE (71) Applicant: SUMITOMO RUBBER INDUSTRIES, LTD., Kobe-shi, Hyogo (JP)

(72) Inventor: Kaori Tanaka, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 640 days.

(21) Appl. No.: 14/161,264

(22) Filed: Jan. 22, 2014

(65) Prior Publication Data

US 2014/0216620 A1 Aug. 7, 2014

(30) Foreign Application Priority Data

Feb. 6, 2013 (JP) .................. 2013-021684

(51) Int. Cl.
  *B60C 11/12* (2006.01)
  *B60C 11/03* (2006.01)
  *B60C 11/00* (2006.01)
  *B60C 11/04* (2006.01)

(52) U.S. Cl.
  CPC ........ *B60C 11/0306* (2013.01); *B60C 11/125* (2013.01); *B60C 11/047* (2013.01); *B60C 11/12* (2013.01); *B60C 2011/0025* (2013.01); *B60C 2011/0346* (2013.01); *B60C 2011/0348* (2013.01); *B60C 2011/0351* (2013.01);
  (Continued)

(58) Field of Classification Search
  CPC ... B60C 11/12; B60C 11/125; B60C 11/0306; B60C 2011/0025; B60C 2011/0351; B60C 2011/0367; B60C 2011/0346; B60C 2011/0365; B60C 11/047; B60C 2200/06; B60C 2011/348
  USPC ..................................... 152/209.25
  See application file for complete search history.

(56) References Cited

U.S. PATENT DOCUMENTS

| | | | | |
|---|---|---|---|---|
| 5,012,847 A | * | 5/1991 | Fukumoto | ........... B60C 11/0306 152/209.18 |
| 5,085,259 A | * | 2/1992 | Goergen | ................. B60C 11/11 152/209.18 |
| 5,526,860 A | * | 6/1996 | Minami | ............. B60C 11/0306 152/209.18 |

(Continued)

FOREIGN PATENT DOCUMENTS

| | | |
|---|---|---|
| EP | 2 610 080 A1 | 7/2013 |
| JP | 6-8711 A | 1/1994 |

*Primary Examiner* — Seyed Masoud Malekzadeh
(74) *Attorney, Agent, or Firm* — Birch, Stewart, Kolasch & Birch, LLP (57) ABSTRACT

A heavy duty pneumatic tire includes a tread portion provided with at least one circumferentially extending main groove, at least one circumferentially extending sub groove, and a plurality of lateral grooves to form repeated pitch elements each of which consists of one lateral groove and a block element. The sub groove includes a shallow bottom part with a depth smaller than that of the main groove. The shallow bottom part of the sub groove is provided with a groove bottom sipe. The lateral grooves include a shallow bottom part with a depth smaller than that of the main groove. The shallow bottom part of the lateral groove is provided with a groove bottom sipe. The lateral grooves have groove widths W2 in a range of from 5% to 15% in relation to a circumferential length L1 of the pitch element.

8 Claims, 6 Drawing Sheets

(52) U.S. Cl.
CPC .......... *B60C 2011/0365* (2013.01); *B60C 2011/0367* (2013.01); *B60C 2200/06* (2013.01)

(56) References Cited

U.S. PATENT DOCUMENTS

| | | | | |
|---|---|---|---|---|
| 5,909,756 | A * | 6/1999 | Miyazaki | B60C 9/2006 152/209.18 |
| 8,875,759 | B2 * | 11/2014 | Hamada | B60C 3/04 152/209.18 |
| 2003/0094227 | A1 * | 5/2003 | Bettiol | B60C 11/01 152/209.18 |
| 2006/0102267 | A1 * | 5/2006 | Takahashi | B60C 11/0306 152/209.18 |
| 2006/0254684 | A1 * | 11/2006 | Tamura | B60C 11/0306 152/209.18 |
| 2007/0000590 | A1 * | 1/2007 | Murata | B60C 11/0083 152/209.8 |
| 2008/0000564 | A1 * | 1/2008 | Mukai | B60C 11/13 152/209.8 |
| 2008/0047643 | A1 * | 2/2008 | Takahashi | B60C 11/0306 152/209.26 |
| 2010/0147062 | A1 * | 6/2010 | Wakao | B60C 11/0318 73/146 |
| 2012/0125501 | A1 * | 5/2012 | Ochi | B60C 11/11 152/209.18 |
| 2012/0145295 | A1 * | 6/2012 | Yamada | B60C 11/0306 152/209.22 |
| 2013/0180638 | A1 * | 7/2013 | Washizuka | B60C 11/0311 152/209.8 |
| 2013/0186532 | A1 * | 7/2013 | Kujime | B60C 11/0304 152/209.8 |

* cited by examiner

HEAVY DUTY PNEUMATIC TIRE

BACKGROUND OF THE INVENTION

Field of the Invention

The present invention relates to a heavy duty pneumatic tire that delivers low fuel consumption while maintaining wet performance.

Description of the Related Art

Japanese Unexamined Patent Application Publication No. H06-008711 discloses a heavy duty pneumatic tire including a tread portion with a plurality of tread blocks that are divided circumferentially extending main grooves and a plurality of lateral grooves. In order to improve fuel efficiency of the tire described above, it is well known to reduce groove widths of the main grooves and the lateral grooves so that the tread pattern rigidity may be enhanced.

However, such a pneumatic tire having grooves with narrow widths tends to have disadvantage of low wet performance.

SUMMARY OF THE INVENTION

The present invention has been worked out in light of the circumstances described above, and has a main object of providing a heavy duty pneumatic tire that delivers low fuel consumption while maintaining wet performance.

According to one aspect of the present invention, a heavy duty pneumatic tire includes a tread portion provided with at least one circumferentially and continuously extending main groove, at least one circumferentially and continuously extending sub groove, and a plurality of lateral grooves to form circumferentially repeated pitch elements each of which consists of one lateral groove and a block element divided between two adjacent lateral grooves. The sub groove includes a shallow bottom part having a depth smaller than that of the main groove, the shallow bottom part of the sub groove provided with a groove bottom sipe extending along the sub groove. The lateral grooves include a shallow bottom part having a depth smaller than that of the main groove. The shallow bottom part of the lateral groove is provided with a groove bottom sipe extending along the lateral groove. The lateral grooves have groove widths W2 in a range of from 5% to 15% in relation to a circumferential length L1 of the pitch element.

In the aspect of the present invention, the tread portion may include the pitch elements in a range of from 40 to 50.

In the aspect of the present invention, the tread portion may include a tread rubber having a loss tangent (tanδ) in a range of not more than 0.08.

In the aspect of the present invention, carbon black may be included in a range of from 40 to 60 parts by mass based on 100 parts by mass of the tread rubber.

In the aspect of the present invention, the at least one main groove may include a pair of crown main grooves disposed both sides a tire equator, and a pair of shoulder main grooves disposed axially outside the crown main grooves, the at least one sub groove may include a middle sub grooves disposed between the crown main groove and the shoulder main groove, and the respective shallow bottom parts of the middle sub groove and the lateral grooves may have depths D2 in a range of from 55% to 75% in relation to a maximum groove depth of the crown main groove.

In the aspect of the present invention, the respective groove bottom sipes of the middle sub groove and the lateral grooves have depths D3 in a range of from 85% to 100% in relation to the maximum groove depth D1 of the crown main groove.

In the aspect of the present invention, the lateral grooves may comprise a plurality of axially inner middle lateral grooves extending from the middle sub groove toward the crown main groove so as to form an inner middle rib between the middle sub groove and the crown main groove, and a plurality of axially outer middle lateral grooves extending from the middle sub groove to the shoulder main groove so as to form a plurality of outer middle blocks, and the respective axial maximum widths W1 of the inner middle rib and the outer middle blocks may be set in a range of from 5% to 12% in relation to a tread width TW.

DETAILED DESCRIPTION

An embodiment of the present invention will be explained below with reference to the accompanying drawings.

Figure 1:
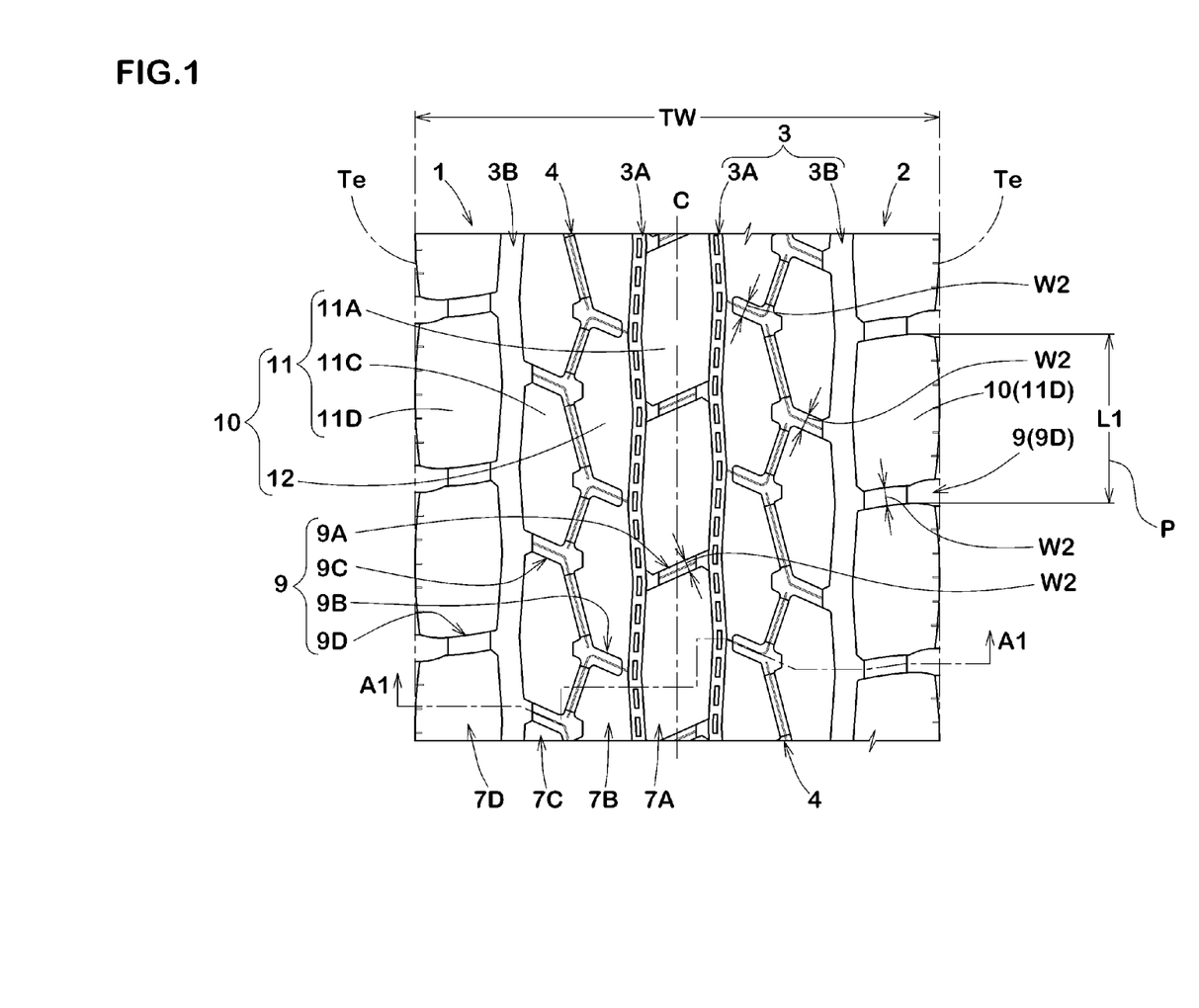
FIG. 1 is a development view of a tread portion of a heavy duty pneumatic tire in accordance with an embodiment of the present invention.
Figure 2:
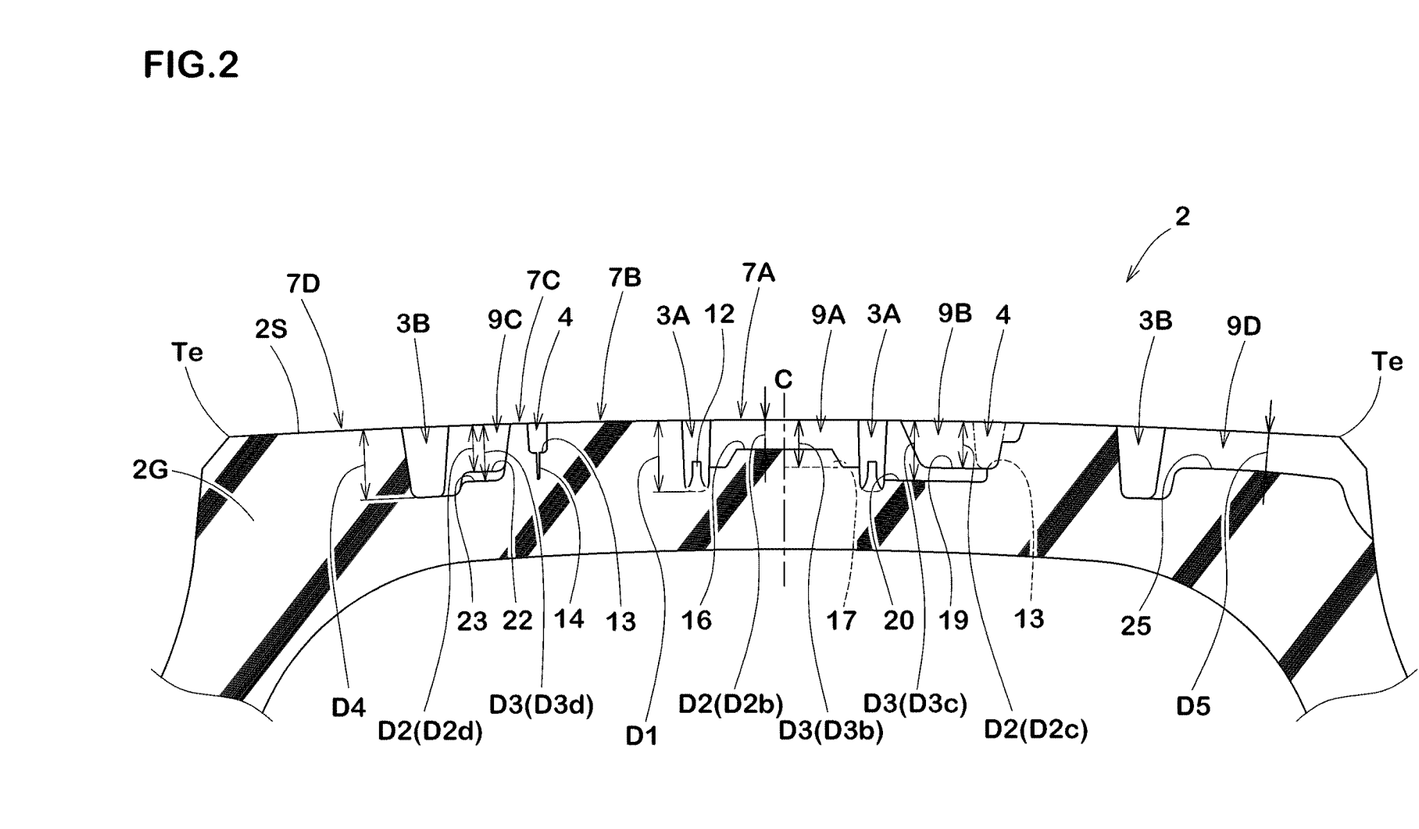
FIG. 2 is a cross sectional view taken along a line A1-A1 in FIG. 1.

FIG. 1 shows a development view of a tread portion 2 of a heavy duty pneumatic tire 1 for trucks or busses in accordance with the present embodiment. FIG. 2 shows a cross sectional view taken along a line A1-A1 in FIG. 1.

Referring to FIG. 2, the tread portion 2 comprises a tread rubber 2G having a ground contact surface 2S. In order to deliver low fuel consumption of the tire by preventing large deformation of the tread rubber 2G during traveling, the tread rubber 2G is preferably made of rubber compound having a loss tangent (tan δ) in a range of not more than 0.08, more preferably not more than 0.078, but preferably not less than 0.04.

Here, loss tangent of the tread rubber 2G is measured with a viscoelastic spectrometer of IWAMOTO SEISAKUSYO. The measuring conditions are as follows:

Initial elongation: 10%;
Amplitude: plus/minus 1%;
Frequency: 10 Hz;
Deformation: Tensile mode; and
Temperature: 70 degrees C.

In order to obtain such a suitable tread rubber 2G having low loss tangent, carbon black is preferably included in a range of from 40 to 60 parts by mass based on 100 parts by mass of the tread rubber 2G. When the carbon black is included more than 60 parts by mass based on 100 parts by mass of the tread rubber 2G, the tread rubber 2G tends to harden, thereby lowering its tipping resistance. Furthermore, when the carbon black is included less than 40 parts by mass based on 100 parts by mass of the tread rubber 2G, the tread rubber 2G tends to soften, thereby lowering its wearing resistance. More preferably, the carbon black may be included in a range of from 45 to 55 parts by mass based on 100 parts by mass of the tread rubber 2G.

Referring back to FIG. 1, the tread portion 2 is provided with at least one, preferably four circumferentially and continuously extending main grooves 3. In this embodiment, the main grooves 3 include a pair of crown main grooves 3A and 3A disposed both sides a tire equator C, and a pair of shoulder main grooves 3B and 3B disposed axially outside the crown main grooves 3A and 3A so as to position the nearest to tread edges Te and Te.

The tread edge Te is defined as an axially outer edge in a ground contact patch of the tread portion 2 under a standard loaded condition in which the tire 1 is mounted on a standard wheel rim with a standard pressure and is loaded with a standard tire load at a camber angle of set to zero.

Here, the standard wheel rim is a wheel rim officially approved or recommended for the tire by standards organizations, i.e. JATMA, TRA, ETRTO, and the like which are effective in the area where the tire is manufactured, sold or used. For example, the standard wheel rim is the "standard rim" specified in JATMA, the "Measuring Rim" in ETRTO, and the "Design Rim" in TRA or the like.

The standard pressure and the standard tire load are the maximum air pressure and the maximum tire load for the tire specified by the same organization in the Air-pressure/Maximum-load Table or similar list.

The standard pressure is the "maximum air pressure" in JATMA, the "Inflation Pressure" in ETRTO, and the maximum pressure given in the "Tire Load Limits at Various Cold Inflation Pressures" table in TRA or the like.

The standard tire load is the "maximum load capacity" in JATMA, the "Load Capacity" in ETRTO, and the maximum value given in the above-mentioned table in TRA or the like.

In this application including specification and claims, various dimensions, positions and the like of the tire refer to those under a standard unloaded condition of the tire unless otherwise noted. The standard unloaded condition is such that the tire 1 is mounted on the standard wheel rim with the standard pressure and is loaded with no tire load. Furthermore, a groove width of a tread groove means a width perpendicular to a groove centerline between facing two groove edges.

The tread portion 2 is further provided with at least one, preferably a pair of circumferentially and continuously extending middle sub grooves 4 each of which is disposed between the crown main groove 3A and the shoulder main groove 3B.

Furthermore, the tread portion 2 is provided with a plurality of lateral grooves 9 that include a plurality of crown lateral grooves 9A extending between the crown main grooves 3A and 3A, a plurality of inner middle lateral grooves 9B extending from the middle sub groove 4 toward the crown main groove 3A, a plurality of axially outer middle lateral grooves 9C extending from the middle sub groove 4 to the shoulder main groove 3B, and a plurality of shoulder lateral grooves 9D extending from the shoulder main groove 3B to the tread edge Te.

The tread portion 2 includes a plurality of land portions 10 that include a crown portion 7A between the crown main grooves 3A and 3A including a plurality of circumferentially arranged crown blocks 11A divided by the crown lateral grooves 9A, a pair of inner middle portions 7B each of which is between the crown main groove 3A and the middle sub groove 4 configured to a rib that continuously extends in the circumferential direction of the tire, a pair of outer middle portions 7C each of which is between the middle sub groove 4 and the shoulder main groove 3B including a plurality of outer middle blocks 11C divided by the outer middle lateral grooves 9C, and a pair of shoulder portions 7D each of which is between the shoulder main groove 3B and the tread edge Te including a plurality of shoulder blocks 11D divided by the shoulder lateral grooves 9D. The inner middle portion 7B includes a block like portion 12 divided between by inner middle lateral grooves 9B.

Preferably, the tread portion 2 has a land ratio in a range of from 70% to 80%. Thus, the tire 1 may maintain preferable wet performance as well as the high pattern rigidity of the tread portion 2 that may prevent its large deformation during traveling, thereby offering low rolling resistance of the tire so that low fuel consumption is obtained.

Here, the land ratio of the tread portion 2 means a ratio "Sc/Sa" of a net ground contact area "Sc" to a gross total ground contact area "Sc" of the tread portion 2 obtained by plugging up the whole grooves.

The tread portion 2 includes circumferentially arranged repeated pitch elements P each of which consists of adjacently one lateral groove 9 and one block (or one block like element 12). Preferably, the tread portion 2 includes the pitch elements P in a range of from 40 to 50. Thus, the tread portion 2 may maintain wet performance due to lateral edges on the lateral grooves 9 while offering its high circumferential rigidity that helps to improve low fuel consumption. More preferably, the tread portion 2 includes the pitch elements P in a range of from 42 to 48.

The lateral grooves 9 have its groove widths W2 in a range of from 5% to 15% in relation to the circumferential length L1 of the pitch element P. Thus, the tread portion 2 may enhance its circumferential rigidity while maintaining the volume of the lateral grooves 9. Accordingly, the tread portion 2 may deliver low fuel consumption while maintaining wet performance of the tire. When the groove width W2 of the lateral groove 9 is more than 15% in relation to the circumferential length L1 of the pitch element P, fuel consumption of the tire tends to be deteriorated due to low circumferential rigidity of the tread portion 2. When the groove widths W2 of the lateral groove 9 is less than 5% in relation to the circumferential length L1 of the pitch element P, wet performance of the tire tends to be deteriorated due to insufficiency of the lateral groove volume. In view of above, the circumferential groove widths W2 of the lateral grooves 9 are preferably set in a range of from 8% to 12% in relation to the circumferential length L1 of the pitch element P.

Figure 3:
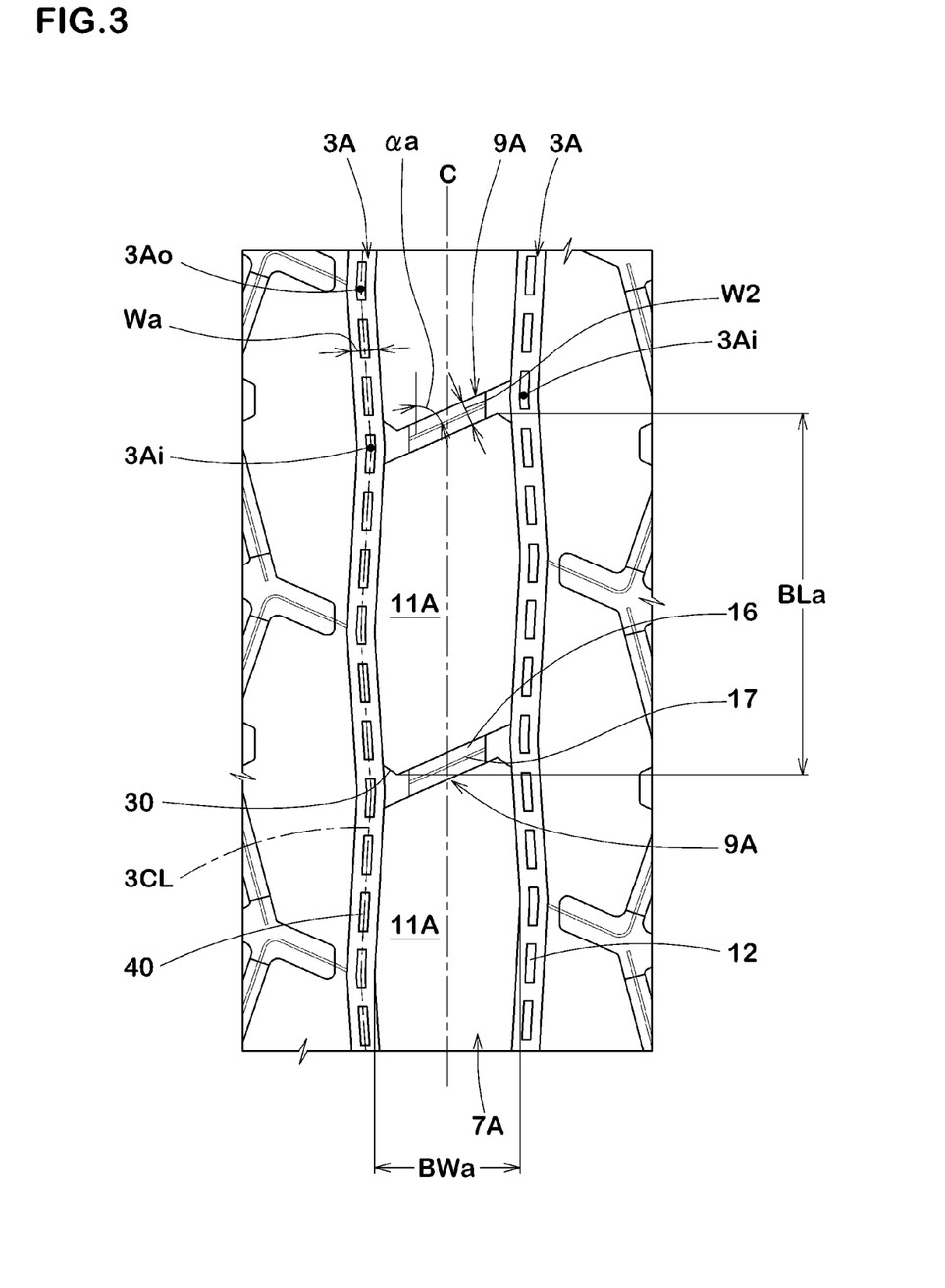
FIG. 3 is a partial enlarged view of a central region of the tread portion.

FIG. 3 shows a partial enlarged view of a central region of the tread portion 2. Referring to FIG. 3, each of the crown main grooves 3A and 3A is configured to a zigzag form with small zigzag amplitude and includes an axially innermost protruding portion 3Ai and an axially outermost protruding portion 3Ao. Regarding the zigzag phase of the crown main grooves 3A, the one is shifted with respect to the other at a circumferential distance. The crown main grooves 3A may improve not only wet performance, but also traction force of the tire using its lateral groove edges.

Referring to FIGS. 2 and 3, in order to further improve the advantage above, the crown main grooves 3A preferably have its groove widths Wa in a range of from 2% to 4% in relation to the tread width TW (shown in FIG. 1). Here, the tread width TW is a width between the tread edges Te and Te. Furthermore, the crown main grooves 3A preferably have its maximum groove depths D1 in a range of from 5% to 8% in relation to the tread width TW.

The crown main groove 3A is provided with a plurality of protrusions 40 protruding radially outwardly of the tire along the groove centerline 3CL on its bottom for avoiding stone-biting thereto. Each protrusion 40 is configured to a circumferentially long rectangular shape in a plan view, for example.

Figure 4:
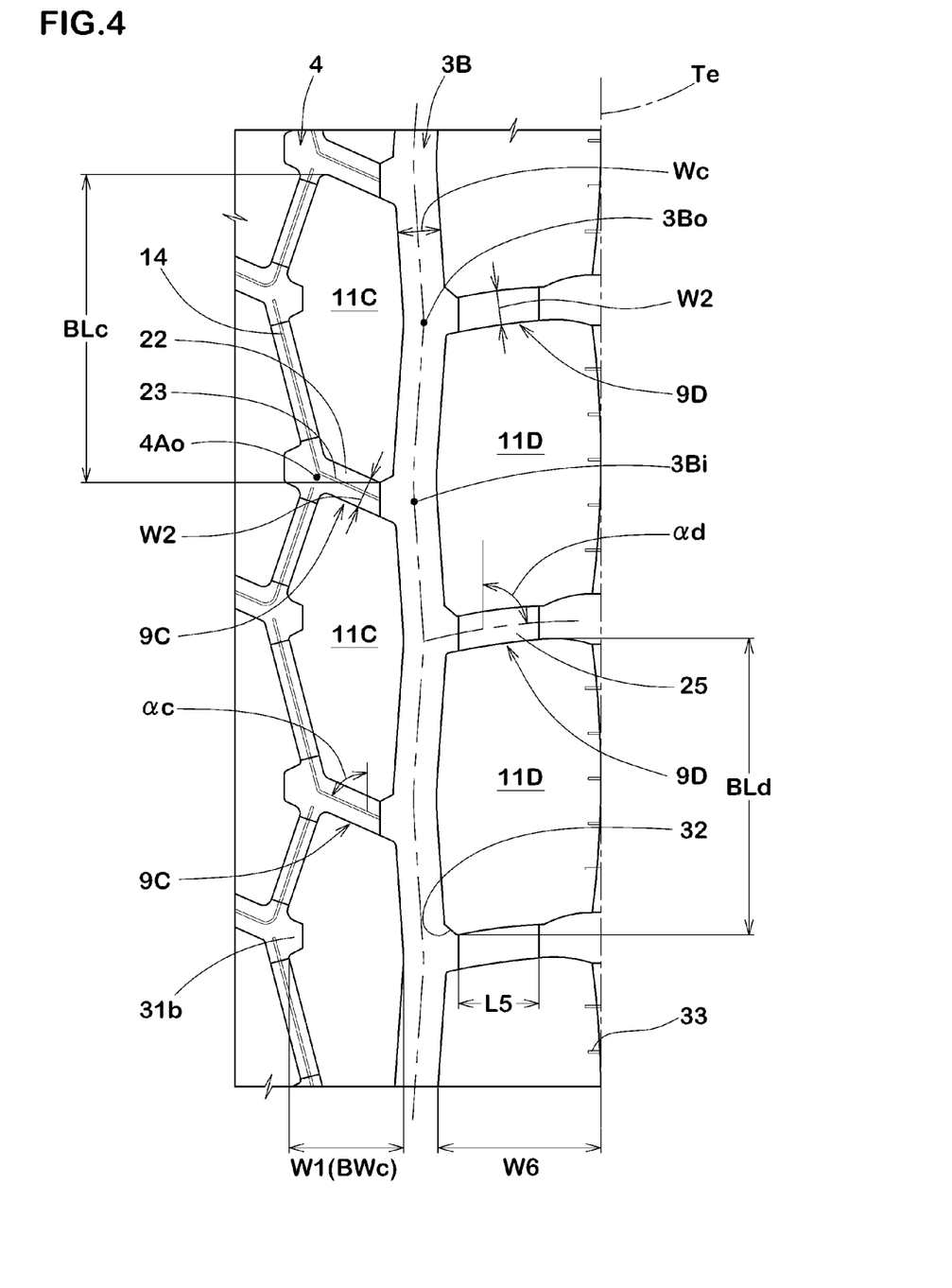
FIG. 4 is a partial enlarged view of a shoulder region of the tread portion.

FIG. 4 shows a partial enlarged view of a shoulder region of the tread portion 2. Referring to FIG. 4, the shoulder main groove 3B is configured to a zigzag form with small zigzag amplitude and includes an axially innermost protruding portion 3Bi and an axially outermost protruding portion 3Bo. The shoulder main grooves 3B may improve not only wet performance, but also traction force of the tire using its lateral groove edges.

In order to further improve the advantage above, the shoulder main groove 3B preferably have its groove width Wc in a range of from 4% to 6% in relation to the tread width TW. Furthermore, the shoulder main groove 3B has its groove depth D4 (shown in FIG. 2) in the same range with the groove depth D1 of the crown main groove 3A. The shoulder main grooves 3B may be provided with a plurality of protrusions for avoiding stone-biting same as the crown main groove 3A, for example.

Figure 5:
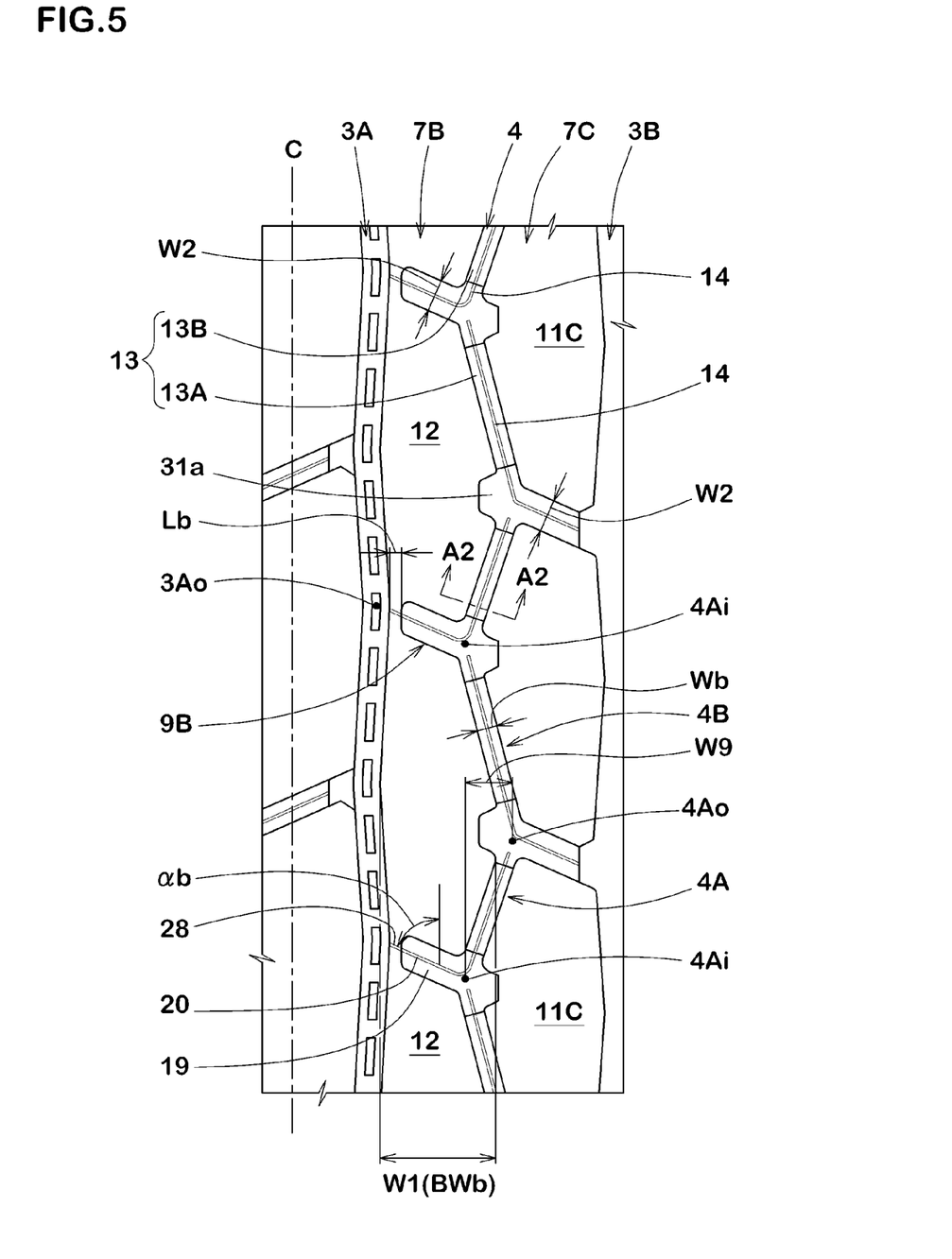
FIG. 5 is a partial enlarged view around a middle sub groove.

FIG. 5 shows a partial enlarged view of the middle sub groove 4 of FIG. 1. Referring to FIG. 5, the middle sub groove 4 is configured to a zigzag form including an axially innermost protruding portion 4Ai and an axially outermost protruding portion 4Ao. In this embodiment, the middle sub groove 4 has the relatively larger zigzag amplitude than those of the crown and shoulder main grooves 3A and 3B. Furthermore, the middle sub groove 4 includes a short inclined element 4A, and a long inclined element 4B having its circumferential length larger than that of the short inclined element 4A.

In order to improve not only wet performance, but also traction force of the tire, the middle sub groove 4 preferably has its groove width Wb in a range of from 1% to 3% in relation to the tread width TW.

Figure 6:
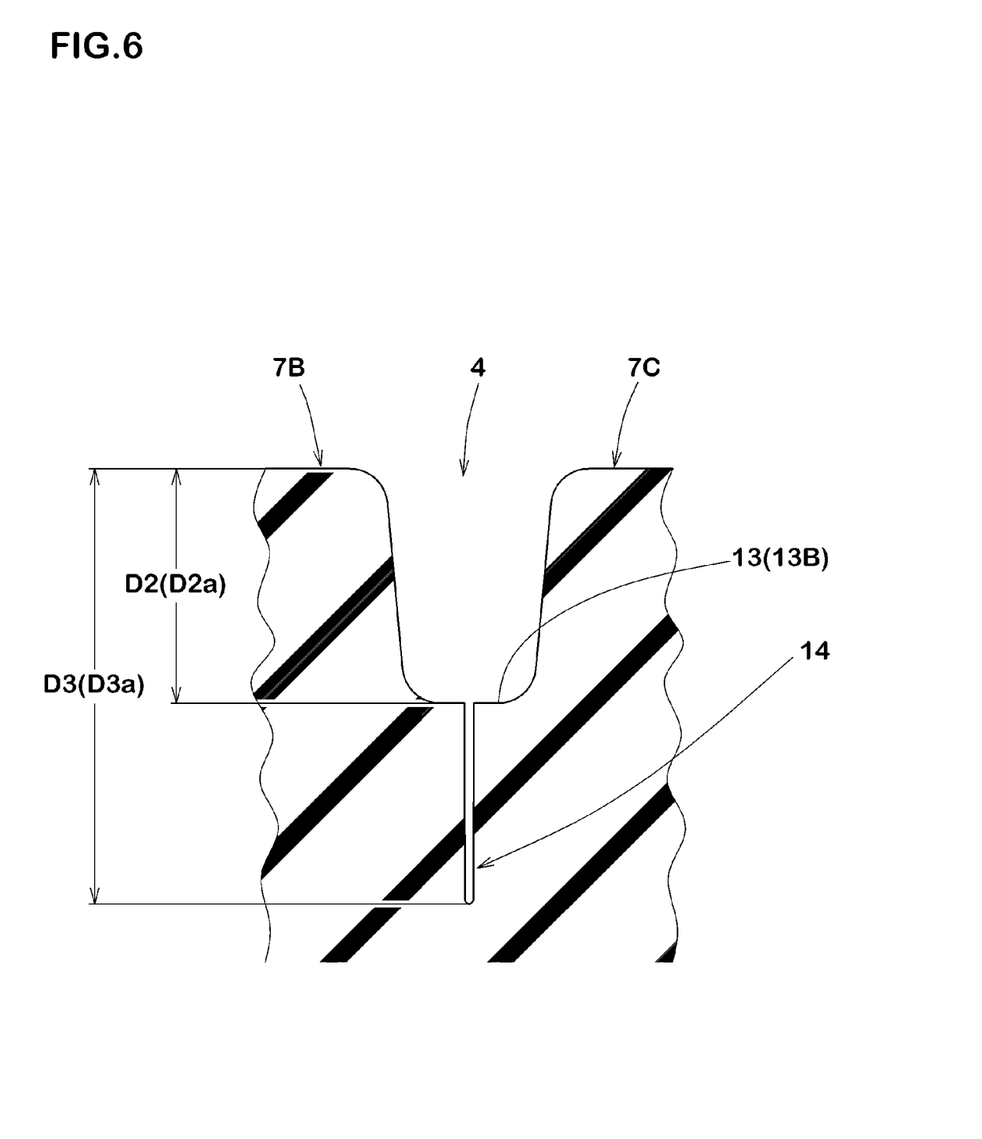
FIG. 6 is a cross sectional view taken along a line A2-A2 in FIG. 5.

FIG. 6 shows a cross sectional view taken along a line A2-A2 in FIG. 5. Referring to FIGS. 5 and 6, the middle sub groove 4 is disposed a shallow bottom part 13 having a depth smaller than that of the crown main groove 3A. The shallow bottom part 13 of the middle sub groove 4 connects the inner middle portion 7B with the outer middle portion 7C so that the pattern rigidity of the tread portion is enhanced. Since the energy loss in the inner and outer middle portions 7B and 7C is reduced, low fuel consumption of the tire may be achieved.

The shallow part 13 preferably has a depth D2a in a range of from 55% to 75% in relation to the maximum groove depth D1 of the crown main groove 3A. In case that the depth D2a of the shallow part 13 is more than 75% in relation to the maximum groove depth D1 of the crown main groove 3A, it may be difficult to reduce the deformation of the inner and outer middle portions 7B and 7C. In case that the depth D2a of the shallow part 13 is less than 55% in relation to the maximum groove depth D1 of the crown main groove 3A, it may be difficult to maintain wet performance of the tire due to the reduction of its groove volume. In view of above, the shallow part 13 more preferably has the depth D2a in a range of from 60% to 70% in relation to the maximum groove depth D1 of the crown main groove 3A.

Referring back to FIG. 5, the shallow part 13 includes a first shallow part 13A disposed on the long inclined element 4B, and a second shallow part 13B disposed on the short inclined element 4A. Furthermore, the second shallow part 13B has its depth deeper than that of the first shallow part 13A. The first shallow part 13A having the relatively small depth may tightly connect the inner middle portion 7B with the outer middle portion 7C so that the fuel consumption of the tire may further be improved. The second shallow part 13B having the relatively deep depth may maintain the groove volume, thereby maintaining its drainage performance.

The first shallow part 13A and the second shallow part 13B are provided with groove bottom sipes 14 that extend along the groove centerline of the middle sub groove 4. The groove bottom sipe 14 may deform during traveling of the tire so as to expand the groove width Wb of the middle sub groove 4, thereby improving wet performance of the tire. Furthermore, since the groove bottom sipe 14 may come into contact on the ground at the last stage of wear of the tread portion 2, its sipe edges may help to improve the wet performance.

Referring to FIG. 6, in order to further improve the advantage above, the groove bottom sipe 14 preferably has the depth $D3a$ in a range of from 85% to 100% in relation to the maximum groove depth D1 of the crown main groove 3A. When the depth $D3a$ of the groove bottom sipe 14 is more than 100% in relation to the maximum groove depth D1 of the crown main groove 3A, the fuel consumption performance of the tire may be deteriorated, since the relatively large deformation may occur on the inner and outer middle portions 7B and 7C during traveling. When the depth $D3a$ of the groove bottom sipe 14 is less than 85% in relation to the maximum groove depth D1 of the crown main groove 3A, the wet performance of the tire at the last stage of wear may be deteriorated. In view of above, the groove bottom sipe 14 more preferably has the depth $D3a$ in a range of from 90% to 95% in relation to the maximum groove depth D1 of the crown main groove 3A.

Referring to FIG. 3, the crown lateral grooves 9A connects between the axially innermost protruding portions 3Ai of the crown main grooves 4, while inclining at an angle $\alpha a$ of from 55 to 75 degrees with respect to the circumferential direction of the tire. The crown lateral grooves 9A may improve traction performance, and steering stability of the tire using its groove edges. Furthermore, the crown lateral grooves 9A may improve wet performance by dispersing the water along its inclination.

Referring to FIGS. 2 and 3, each crown lateral groove 9A includes a shallow bottom part 16 having a depth smaller than that of the crown main grooves 3A for connecting the adjacent crown blocks 11A and 11A. Thus, deformation of the crown blocks 11A during traveling may be reduced, thereby decreasing rolling resistance of the tire. The shallow bottom part 16 preferably has its depth $D2b$ in a range of 55% to 75%, more preferably 60% to 70%, in relation to the maximum groove depth D1 of the crown main groove 3A, in order to further improve rolling resistance while maintaining wet performance of the tire.

The shallow bottom part 16 of the crown lateral groove 9A is disposed a groove bottom sipe 17 that extends along the groove centerline of the crown lateral groove 9A, for example. The groove bottom sipe 17 may deform during traveling of the tire so as to expand the groove width W2 of the crown lateral groove 9A, thereby improving wet performance of the tire. Furthermore, since the groove bottom sipe 17 may come into contact on the ground at the last stage of wear of the tread portion 2, its sipe edges may help to improve the wet performance.

In order to further improve the advantage above, the groove bottom sipe 17 preferably has the depth $D3b$ in a range of from 85% to 100% in relation to the maximum groove depth D1 of the crown main groove 3A. When the depth $D3b$ of the groove bottom sipe 17 is more than 100% in relation to the maximum groove depth D1 of the crown main groove 3A, the fuel consumption performance of the tire may be deteriorated due to the relatively large deformation on the crown blocks 11A during traveling. When the depth D3b of the groove bottom sipe 17 is less than 85% in relation to the maximum groove depth D1 of the crown main groove 3A, the wet performance of the tire at the last stage of wear may be deteriorated. In view of above, the groove bottom sipe 17 more preferably has the depth D3b in a range of from 90% to 95% in relation to the maximum groove depth D1 of the crown main groove 3A.

Referring to FIG. 5, each axially inner middle lateral groove 9B extends from the axially innermost protruding portion 4Ai of the middle sub groove 4 toward the axially outermost protruding portion 3Ao of the crown main groove 3A, while inclining at an angle αb of from 55 to 75 degrees with respect to the circumferential direction of the tire. The axially inner lateral grooves 9B may improve wet performance by dispersing the water along its inclination.

The axially inner middle lateral groove 9B terminates without communicating with the crown main groove 3A. Thus, since the air compressed by the crown main groove 3A during traveling does not flow into the axially inner middle lateral groove 9B, noise during traveling may be reduced. Preferably, the axial distance Lb between the inner end of the axially inner middle lateral groove 9B and the crown main groove 3A is set in a range of from 1.3% to 2.5% in relation to the tread width TW.

Referring to FIGS. 2 and 5, each axially inner middle lateral groove 9B includes a shallow bottom part 19 having a depth smaller than that of the crown main grooves 3A for enhancing rigidity of the axially inner middle portion 7B. Thus, deformation of the inner middle portion 7B during traveling may be reduced, thereby decreasing rolling resistance of the tire. The shallow bottom part 19 preferably has its depth D2c in a range of 55% to 75%, more preferably 60% to 70%, in relation to the maximum groove depth D1 of the crown main groove 3A, in order to further improve rolling resistance while maintaining wet performance of the tire.

The shallow bottom part 19 of the axially inner middle lateral groove 9B is disposed an axially inner groove bottom sipe 20 that extends along the groove centerline of the axially inner middle lateral groove 9B, for example. The axially inner groove bottom sipe 20 may deform during traveling of the tire so as to expand the groove width W2 of the axially inner middle lateral groove 9B, thereby improving wet performance of the tire. Furthermore, since the axially inner groove bottom sipe 20 may come into contact on the ground at the last stage of wear, its sipe edges may help to improve the wet performance.

In order to further improve the advantage above, the axially inner groove bottom sipe 20 preferably has the depth D3c in a range of from 85% to 100%, more preferably in a range of from 90% to 95%, in relation to the maximum groove depth D1 of the crown main groove 3A.

The axially inner groove bottom sipe 20 preferably has an axially outer end that is connected with the groove bottom sipe 14 at the axially innermost portion 4Ai of the middle sub groove 4. Thus, the axially inner middle lateral groove 9B and the middle sub groove 4 may deform so as to expand its groove widths W2 and Wb, thereby improving the wet performance of the tire.

Referring to FIG. 4, each axially outer middle lateral groove 9C extends from the axially outermost protruding portions 4Ao of the middle sub groove 4 to the axially innermost protruding portion 3Bi of the shoulder main groove 3B, while inclining at an angle αc of from 55 to 75 degrees with respect to the circumferential direction of the tire. The axially outer middle lateral groove 9C may improve traction performance, and steering stability of the tire using its groove edges. Furthermore, the axially outer middle lateral grooves 9C may improve wet performance by dispersing the water toward the axially outside of the tire along its inclination.

Referring to FIGS. 2 and 4, the each axially outer middle lateral groove 9C includes a shallow bottom part 22 having its depth smaller than that of the crown main grooves 3A for connecting the adjacent axially outer middle blocks 7C. Thus, deformation of the outer middle blocks 7C during traveling may be reduced, thereby decreasing rolling resistance of the tire. The shallow bottom part 22 preferably has its depth D2d (shown in FIG. 2) in a range of 55% to 75%, more preferably 60% to 70%, in relation to the maximum groove depth D1 of the crown main groove 3A, in order to further improve rolling resistance while maintaining wet performance of the tire.

The shallow bottom part 22 of the axially outer middle lateral groove 9C is disposed an axially outer groove bottom sipe 23 that extends along the groove centerline of the axially outer middle lateral groove 9C, for example. The axially outer groove bottom sipe 23 may deform during traveling of the tire so as to expand the groove width W2 of the axially outer middle lateral groove 9C, thereby improving wet performance of the tire. Furthermore, since the axially outer groove bottom sipe 23 may come into contact on the ground at the last stage of wear, its sipe edges may help to improve the wet performance.

In order to further improve the advantage above, the axially outer groove bottom sipe 23 preferably has the depth D3d in a range of from 85% to 100%, more preferably in a range of from 90% to 95%, in relation to the maximum groove depth D1 of the crown main groove 3A.

The axially outer groove bottom sipe 23 preferably has an axially inner end being connected with the groove bottom sipe 14 at the axially outermost portion 4Ao of the middle sub groove 4. Thus, the axially outer middle lateral groove 9C and the middle sub groove 4 may deform so as to expand its groove widths. Wb, thereby improving the wet performance of the tire.

Referring to FIG. 4, the shoulder lateral groove 9D extends from the axially outermost protruding portion 3Bo of the shoulder main groove 3B to the tread edge Te, while inclining at an angle αd in a range of from 70 to 90 degrees with respect to the circumferential direction of the tire. The shoulder lateral groove 9D may improve traction performance, steering stability and wet performance, like the crown lateral grooves 9A, the inner middle lateral groove 9B, and the outer middle lateral groove 9C.

Referring to FIGS. 2 and 4, each shoulder lateral grooves 9D includes a shallow bottom part 25 having its depth smaller than that of the crown main grooves 3A for connecting the adjacent shoulder blocks 11D. Thus, deformation of the shoulder blocks 11D during traveling may be reduced, thereby decreasing rolling resistance of the tire. The shallow bottom part 25 preferably has its depth D5 in a range of 55% to 75%, more preferably 60% to 70%, in relation to the maximum groove depth D1 of the crown main groove 3A, in order to further improve rolling resistance while maintaining wet performance of the tire. Furthermore, the shallow bottom part 25 preferably has its axial length L5 in a range of 40% to 60% in relation to the axial width W6 of the shoulder block 11D, in order to maintain drainage performance thereof as well as rolling resistance of the tire.

In order to effectively enhance the rigidity of the shoulder blocks 11, the shallow bottom part 25 of the shoulder lateral groove 9D is not disposed any groove bottom sipe, for example.

The tire 1 in accordance with the present embodiment includes the middle sub groove 4, crown lateral groove 9A, inner middle lateral groove 9B, outer middle lateral groove 9C, and shoulder lateral groove 9D which respectively provided with the shallow bottom parts 13, 16, 19, and 22, thereby delivering low fuel consumption of the tire. Furthermore, the shallow bottom parts 13, 16, 19, 22 and 25 are provided with the groove bottom sipes 14, 17, 20 and 23, respectively, thereby improving wet performance at the last stage of wear on the tread portion 2. Furthermore, since the groove widths W2 of the lateral grooves 9 is defined as a certain range in relation to the circumferential length L1 of the pitch elements P, the tread rigidity may be improved while maintaining wet performance of the tire. Thus, the tire 1 in accordance with the present embodiment may deliver low fuel consumption while maintaining wet performance.

Referring to FIG. 3, the crown block 11A has a circumferentially long rectangular shape in a plan view having its circumferential length BLa larger than its axial width BWa. Preferably, the crown block 11A has the axial width BWa in a range of from 8% to 20% in relation to the tread width TW, in order to reduce energy loss generated in the crown block 11A by preventing its large deformation.

The crown block 11A is provided with a chamfer portion 30 at a corner portion having an acute angle between the crown lateral groove 9A and the crown main groove 3A. The chamfer portion 30 may prevent the corner portion above from chipping. Furthermore, the chamfer portion 30 may disturb the air flow passing through the crown main groove 3A so that the resonance noise at the crown main groove 3A is reduced.

Referring to FIG. 4, the axially outer middle block 11C has a circumferentially long hexagonal shape in a plan view having its circumferential length BLc larger than its axial width W1 (BWc). The outer middle block 11C with high circumferential rigidity may further improve fuel consumption, traction performance, and steering stability of the tire.

Preferably, the outer middle block 11C has the axial width W1 in a range of from 5% to 12% in relation to the tread width TW. When the axial width W1 of the outer middle block 11C is more than 12% in relation to the tread width TW, the land ratio of the tread portion 2 tends to increase, thereby lowering wet performance of the tire. When the axial width W1 of the outer middle block 11C is less than 5% in relation to the tread width TW, steering stability of the tire may be deteriorated. More preferably, the axial width W1 of the outer middle block 11C is set in a range of from 7% to 10% in relation to the tread width TW.

In this embodiment, a recess 31b is disposed on the axially outer middle block 11C. The recess 31b extends axially outwardly of the tire in a short length from the axially innermost protruding portion 4Ai of the middle sub groove 4. The recess 31b may further improve wet performance as well as chipping resistance of the axially outer middle block 11C.

The shoulder block 11D has a circumferentially long rectangular shape in a plan view having its circumferential length BLd larger than its axial width W6. The shoulder block 11D with high circumferential rigidity may further improve fuel consumption, traction performance, and steering stability of the tire. Preferably, the shoulder block 11D has the axial width W6 in a range of from 10% to 20% in relation to the tread width TW.

The shoulder block 11D is provided with a chamfer portion 32 at a corner portion having an acute angle between the shoulder lateral groove 9D and the shoulder main groove 3B. The chamfer portion 32 may improve chipping resistance of the shoulder block 11 as well as noise performance.

The shoulder block 11C is provided with a plurality of shoulder sipes 33 extending axially inwardly of the tire in a short length from the tread edge Te. The shoulder sipes 33 may improve wandering-property of the tire by offering the shoulder block 11D having outer edge softened.

Referring to FIG. 5, the inner middle portion 7B is configured to a circumferentially extending rib. Here, the rib of the tread portion 2 means a land portion that continuously extending in the circumferential direction of the tire without any lateral groove that entirely traverses the land portion. Since the inner middle portion 7B formed as the rib tends to have its high circumferential and lateral rigidity, steering stability, fuel consumption performance, and the straight running stability may be improved.

Preferably, the inner middle portion 7B has the axial width W1 (BWb) in a range of from 5% to 12%, more preferably in a range of from 7% to 10% in relation to the tread width TW.

The inner middle portion 7B is provided with a sipe 28 connecting the axially inner middle groove bottom sipe 20 with the crown main groove 3A. The sipe 28 may help to lower the rigidity of the inner middle portion 7B so as to prevent stress concentration thereto. Furthermore, the amount of edges on the inner middle portion 7B is increased due to the sipe 28, thereby improving wet performance.

In this embodiment, a recess 31a is disposed on the inner middle portion 7B. The recess 31a extends axially inwardly of the tire in a short length from the axially outermost protruding portion 4Ao of the middle sub groove 4. The recess 31a may further improve wet performance as well as chipping resistance of the inner middle portion 7B.

The present invention is more specifically described and explained by means of the following Examples and References. It is to be understood that the present invention is not limited to these Examples and embodiments described above.

Comparison Test

Heavy duty pneumatic tires shown in FIG. 1 and Table 1 were made and tested. Major common specifics of the tires and test methods are as follows.

Details of test tires:
 Tire size: 275/80R22.5 151/148J
 Rim: 22.5×7.5
 Internal pressure: 900 kPa
 Tread width TW: 248 mm
 Crown main groove width Wa: 6 mm
 Crown main groove depth D1: 16 mm Fuel consumption performance test (Rolling resistance test):
 Rolling resistance of each test tire was measured under the following condition, using a tester. The test results were evaluated as the reciprocal of the rolling resistance and were indicated using an index based on Ex. 1 being 100 in Table 1. The larger the index, the better the rolling resistance is.
 Tire load: 33.83 kN
 Speed: 80 km/h Wet performance test:
 The test tires with 75% worn were installed in a 2-D truck with a full load to its carrying capacity 10 tons, as its whole wheels. Then, a test driver suddenly started the truck using the second gear position by engaging its clutch at the timing of a 1,500 rpm engine speed on a wet asphalt road with a puddle 5 mm deep, and measured the time for traveling to 10 m distance. The test results were evaluated as the reciprocal of the time and were indicated using an index based on Ex. 1 being 100 in Table 1. The larger the index, the better the wet performance is.

Wear resistance test:

The tire of Ex. 1 was installed to the truck above as its one of the rear wheels, and the test tire was installed to the other one of the rear wheels. Then, a traveling distance of the truck until when the depth of the crown main groove of any rear tire wore to 1.6 mm depth was measured. The test results were evaluated as the reciprocal of the traveling distance and were indicated using an index based on Ex. 1 being 100 in Table 1. The larger the index, the better the wear resistance is.

Anti chipping performance test:

Chipping visible to the naked eyes on the tread portion of each test tire was checked after the wear resistance test with respect to its number and size. The test results were evaluated and indicated using an index based on Ex. 1 being 100 in Table 1. The larger the index, the better the chipping resistance is.

Test results are shown in Table 1. From the test results, it was confirmed that Example tires in accordance with the present invention can be effectively improved rolling resistance while maintaining wet performance.

TABLE 1-1

|  | Ref. 1 | Ref. 2 | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| Ratio W2/L1 (%) | 1 | 20 | 10 | 5 | 15 | 10 | 10 | 10 | 10 | 10 | 10 | 10 |
| Number of pitch elements | 45 | 45 | 45 | 45 | 45 | 40 | 50 | 45 | 45 | 45 | 45 | 45 |
| Tan δ of tread rubber | 0.078 | 0.078 | 0.078 | 0.078 | 0.078 | 0.078 | 0.078 | 0.08 | 0.078 | 0.078 | 0.078 | 0.078 |
| Carbon content (mass %) | 50 | 50 | 50 | 50 | 50 | 50 | 50 | 50 | 40 | 45 | 55 | 60 |
| Ratio D2b/D1 (%) | 65 | 65 | 65 | 65 | 65 | 65 | 65 | 65 | 65 | 65 | 65 | 65 |
| Ratio D3b/D1 (%) | 90 | 90 | 90 | 90 | 90 | 90 | 90 | 90 | 90 | 90 | 90 | 90 |
| Ratio D2a/D1 (%) | 65 | 65 | 65 | 65 | 65 | 65 | 65 | 65 | 65 | 65 | 65 | 65 |
| Ratio D3a/D1 (%) | 90 | 90 | 90 | 90 | 90 | 90 | 90 | 90 | 90 | 90 | 90 | 90 |
| Ratio D2c/D1 (%) | 65 | 65 | 65 | 65 | 65 | 65 | 65 | 65 | 65 | 65 | 65 | 65 |
| Ratio D3c/D1 (%) | 90 | 90 | 90 | 90 | 90 | 90 | 90 | 90 | 90 | 90 | 90 | 90 |
| Ratio D2d/D1 (%) | 65 | 65 | 65 | 65 | 65 | 65 | 65 | 65 | 65 | 65 | 65 | 65 |
| Ratio D3d/D1 (%) | 90 | 90 | 90 | 90 | 90 | 90 | 90 | 90 | 90 | 90 | 90 | 90 |
| Ratio D5/D1 (%) | 65 | 65 | 65 | 65 | 65 | 65 | 65 | 65 | 65 | 65 | 65 | 65 |
| Ratio W1/TW (%) | 10 | 10 | 10 | 10 | 10 | 10 | 10 | 10 | 10 | 10 | 10 | 10 |
| Fuel consumption performance (Index) | 100 | 95 | 100 | 100 | 98 | 100 | 98 | 98 | 100 | 100 | 100 | 98 |
| Wet performance (Index) | 95 | 100 | 100 | 98 | 100 | 98 | 100 | 100 | 100 | 100 | 100 | 100 |
| Wear resistance performance (Index) | 100 | 100 | 100 | 100 | 100 | 100 | 100 | 100 | 98 | 100 | 100 | 100 |
| Anti chipping performance (Index) | 100 | 100 | 100 | 100 | 100 | 100 | 100 | 100 | 100 | 100 | 100 | 98 |

TABLE 1-2

|  | Ex. 11 | Ex. 12 | Ex. 13 | Ex. 14 | Ex. 15 | Ex. 16 | Ex. 17 | Ex. 18 | Ex. 19 | Ex. 20 | Ex. 21 | Ex. 22 |
|---|---|---|---|---|---|---|---|---|---|---|---|---|
| Ratio W2/L1 (%) | 10 | 10 | 10 | 10 | 10 | 10 | 10 | 10 | 10 | 10 | 10 | 10 |
| Number of pitch elements | 45 | 45 | 45 | 45 | 45 | 45 | 45 | 45 | 45 | 45 | 45 | 45 |
| Tan δ of tread rubber | 0.078 | 0.078 | 0.078 | 0.078 | 0.078 | 0.078 | 0.078 | 0.078 | 0.078 | 0.078 | 0.078 | 0.078 |
| Carbon content (mass %) | 50 | 50 | 50 | 50 | 50 | 50 | 50 | 50 | 50 | 50 | 50 | 50 |
| Ratio D2b/D1 (%) | 55 | 60 | 70 | 75 | 65 | 65 | 65 | 65 | 65 | 65 | 65 | 65 |
| Ratio D3b/D1 (%) | 90 | 90 | 90 | 90 | 85 | 95 | 100 | 90 | 90 | 90 | 90 | 90 |
| Ratio D2a/D1 (%) | 65 | 65 | 65 | 65 | 65 | 65 | 65 | 55 | 60 | 70 | 75 | 65 |
| Ratio D3a/D1 (%) | 90 | 90 | 90 | 90 | 90 | 90 | 90 | 90 | 90 | 90 | 90 | 85 |
| Ratio D2c/D1 (%) | 65 | 65 | 65 | 65 | 65 | 65 | 65 | 65 | 65 | 65 | 65 | 65 |
| Ratio D3c/D1 (%) | 90 | 90 | 90 | 90 | 90 | 90 | 90 | 90 | 90 | 90 | 90 | 90 |
| Ratio D2d/D1 (%) | 65 | 65 | 65 | 65 | 65 | 65 | 65 | 65 | 65 | 65 | 65 | 65 |
| Ratio D3d/D1 (%) | 90 | 90 | 90 | 90 | 90 | 90 | 90 | 90 | 90 | 90 | 90 | 90 |
| Ratio D5/D1 (%) | 65 | 65 | 65 | 65 | 65 | 65 | 65 | 65 | 65 | 65 | 65 | 65 |
| Ratio W1/TW (%) | 10 | 10 | 10 | 10 | 10 | 10 | 10 | 10 | 10 | 10 | 10 | 10 |
| Fuel consumption performance (Index) | 100 | 100 | 100 | 98 | 100 | 100 | 98 | 100 | 100 | 100 | 98 | 100 |
| Wet performance (Index) | 98 | 100 | 100 | 100 | 98 | 100 | 100 | 98 | 100 | 100 | 100 | 98 |
| Wear resistance performance (Index) | 100 | 100 | 100 | 98 | 100 | 100 | 100 | 100 | 100 | 100 | 98 | 100 |
| Anti chipping performance (Index) | 100 | 100 | 100 | 100 | 100 | 100 | 100 | 100 | 100 | 100 | 100 | 100 |

TABLE 1-3

|  | Ex. 23 | Ex. 24 | Ex. 25 | Ex. 26 | Ex. 27 | Ex. 28 | Ex. 29 | Ex. 30 | Ex. 31 | Ex. 32 | Ex. 33 | Ex. 34 |
|---|---|---|---|---|---|---|---|---|---|---|---|---|
| Ratio W2/L1 (%) | 10 | 10 | 10 | 10 | 10 | 10 | 10 | 10 | 10 | 10 | 10 | 10 |
| Number of pitch elements | 45 | 45 | 45 | 45 | 45 | 45 | 45 | 45 | 45 | 45 | 45 | 45 |

TABLE 1-3-continued

|  | Ex. 23 | Ex. 24 | Ex. 25 | Ex. 26 | Ex. 27 | Ex. 28 | Ex. 29 | Ex. 30 | Ex. 31 | Ex. 32 | Ex. 33 | Ex. 34 |
|---|---|---|---|---|---|---|---|---|---|---|---|---|
| Tan δ of tread rubber | 0.078 | 0.078 | 0.078 | 0.078 | 0.078 | 0.078 | 0.078 | 0.078 | 0.078 | 0.078 | 0.078 | 0.078 |
| Carbon content (mass %) | 50 | 50 | 50 | 50 | 50 | 50 | 50 | 50 | 50 | 50 | 50 | 50 |
| Ratio D2b/D1 (%) | 65 | 65 | 65 | 65 | 65 | 65 | 65 | 65 | 65 | 65 | 65 | 65 |
| Ratio D3b/D1 (%) | 90 | 90 | 90 | 90 | 90 | 90 | 90 | 90 | 90 | 90 | 90 | 90 |
| Ratio D2a/D1 (%) | 65 | 65 | 65 | 65 | 65 | 65 | 65 | 65 | 65 | 65 | 65 | 65 |
| Ratio D3a/D1 (%) | 95 | 100 | 90 | 90 | 90 | 90 | 90 | 90 | 90 | 90 | 90 | 90 |
| Ratio D2c/D1 (%) | 65 | 65 | 55 | 60 | 70 | 75 | 65 | 65 | 65 | 65 | 65 | 65 |
| Ratio D3c/D1 (%) | 90 | 90 | 90 | 90 | 90 | 90 | 85 | 95 | 100 | 90 | 90 | 90 |
| Ratio D2d/D1 (%) | 65 | 65 | 65 | 65 | 65 | 65 | 65 | 65 | 65 | 55 | 60 | 70 |
| Ratio D3d/D1 (%) | 90 | 90 | 90 | 90 | 90 | 90 | 90 | 90 | 90 | 90 | 90 | 90 |
| Ratio D5/D1 (%) | 65 | 65 | 65 | 65 | 65 | 65 | 65 | 65 | 65 | 65 | 65 | 65 |
| Ratio W1/TW (%) | 10 | 10 | 10 | 10 | 10 | 10 | 10 | 10 | 10 | 10 | 10 | 10 |
| Fuel consumption performance (Index) | 100 | 98 | 100 | 100 | 100 | 98 | 100 | 100 | 98 | 100 | 100 | 100 |
| Wet performance (Index) | 100 | 100 | 98 | 100 | 100 | 100 | 98 | 100 | 98 | 100 | 100 | 100 |
| Wear resistance performance (Index) | 100 | 100 | 100 | 100 | 100 | 98 | 100 | 100 | 100 | 100 | 100 | 100 |
| Anti chipping performance (Index) | 100 | 100 | 100 | 100 | 100 | 100 | 100 | 100 | 100 | 100 | 100 | 100 |

TABLE 1-4

|  | Ex. 35 | Ex. 36 | Ex. 37 | Ex. 38 | Ex. 39 | Ex. 40 | Ex. 41 | Ex. 42 | Ex. 43 | Ex. 44 |
|---|---|---|---|---|---|---|---|---|---|---|
| Ratio W2/L1 (%) | 10 | 10 | 10 | 10 | 10 | 10 | 10 | 10 | 10 | 10 |
| Number of pitch elements | 45 | 45 | 45 | 45 | 45 | 45 | 45 | 45 | 45 | 45 |
| Tan δ of tread rubber | 0.078 | 0.078 | 0.078 | 0.078 | 0.078 | 0.078 | 0.078 | 0.078 | 0.078 | 0.078 |
| Carbon content (mass %) | 50 | 50 | 50 | 50 | 50 | 50 | 50 | 50 | 50 | 50 |
| Ratio D2b/D1 (%) | 65 | 65 | 65 | 65 | 65 | 65 | 65 | 65 | 65 | 65 |
| Ratio D3b/D1 (%) | 90 | 90 | 90 | 90 | 90 | 90 | 90 | 90 | 90 | 90 |
| Ratio D2a/D1 (%) | 65 | 65 | 65 | 65 | 65 | 65 | 65 | 65 | 65 | 65 |
| Ratio D3a/D1 (%) | 90 | 90 | 90 | 90 | 90 | 90 | 90 | 90 | 90 | 90 |
| Ratio D2c/D1 (%) | 65 | 65 | 65 | 65 | 65 | 65 | 65 | 65 | 65 | 65 |
| Ratio D3c/D1 (%) | 90 | 90 | 90 | 90 | 90 | 90 | 90 | 90 | 90 | 90 |
| Ratio D2d/D1 (%) | 75 | 65 | 65 | 65 | 65 | 65 | 65 | 65 | 65 | 65 |
| Ratio D3d/D1 (%) | 90 | 85 | 95 | 100 | 90 | 90 | 90 | 90 | 90 | 90 |
| Ratio D5/D1 (%) | 65 | 65 | 65 | 65 | 55 | 60 | 70 | 75 | 65 | 65 |
| Ratio W1/TW (%) | 10 | 10 | 10 | 10 | 10 | 10 | 10 | 10 | 5 | 12 |
| Fuel consumption performance (Index) | 98 | 100 | 100 | 98 | 100 | 100 | 100 | 98 | 98 | 100 |
| Wet performance (Index) | 100 | 98 | 100 | 100 | 98 | 100 | 100 | 100 | 100 | 98 |
| Wear resistance performance (Index) | 98 | 100 | 100 | 100 | 100 | 100 | 100 | 98 | 100 | 100 |
| Anti chipping performance (Index) | 100 | 100 | 100 | 100 | 100 | 100 | 100 | 100 | 100 | 100 |

What is claimed is:

1. A heavy duty pneumatic tire comprising:

a tread portion provided with at least one circumferentially and continuously extending main groove, at least one circumferentially and continuously extending sub groove, and a plurality of lateral grooves to form circumferentially repeated pitch elements each of which consists of one lateral groove and a block element divided between two adjacent lateral grooves;

the sub groove comprising a continuous sub groove shallow bottom part having a depth smaller than that of the at least one main groove, the sub groove shallow bottom part provided with a groove bottom sipe extending along the sub groove; and the plurality of lateral grooves comprising a lateral groove shallow bottom part having a depth smaller than that of the at least one main groove, the lateral groove shallow bottom part provided with a lateral groove bottom sipe extending along the respective lateral groove, the lateral grooves having groove widths W2 in a range of from 5% to 15% in relation to a circumferential length L1 of each pitch element, wherein the at least one main groove comprises a pair of crown main grooves disposed on both sides of a tire equator, and a pair of shoulder main grooves disposed axially outside the crown main grooves, wherein the at least one sub groove comprises a middle sub groove disposed between adjacent crown main groove and shoulder main groove on each side of the tire equator, wherein the lateral grooves comprise a plurality of axially inner middle lateral grooves extending axially inwardly from the middle sub groove without reaching each crown main groove on each side of the tire equator so as to form an inner middle rib between the middle sub groove and the crown main groove on each side of the tire equator, and a plurality of axially outer middle lateral grooves extending from the middle sub groove to the shoulder main groove on each side of the tire equator so as to form a plurality of outer middle blocks on each side of the tire equator, wherein the shallow bottom part of the middle sub groove comprises a first shallow part and a second shallow part having a depth deeper than that of the first shallow part, and wherein the middle sub groove has a zigzag form that comprises a short inclined element and a long inclined element that is inclined in an opposite direction to the short inclined element and has a circumferential length larger than that of the short inclined element, the first shallow part is disposed on the short inclined element, and the second shallow part is disposed on the long inclined element.

2. The tire according to claim 1, wherein the tread portion comprises a number of the pitch elements in a range of from 40 to 50.

3. The tire according to claim 1, wherein the tread portion comprises a tread rubber having a loss tangent (tan δ) in a range of not more than 0.08.

4. The tire according to claim 3, wherein carbon black is included in a range of from 40 to 60 parts by mass based on 100 parts by mass of the tread rubber.

5. The tire according to claim 1, wherein the sub groove shallow bottom part of the middle sub groove and the lateral groove shallow bottom part have depths D2 in a range of from 55% to 75% in relation to a maximum groove depth D1 of the crown main grooves.

6. The tire according to claim 5, wherein the sub groove bottom sipe of the middle sub groove and the lateral groove bottom sipe have depths D3 in a range of from 85% to 100% in relation to a maximum groove depth D1 of the crown main grooves.

7. The tire according to claim 5, wherein axial maximum widths W1 of the inner middle rib and the outer middle blocks are in a range of from 5% to 12% in relation to a tread width TW.

8. A heavy duty pneumatic tire comprising:

a tread portion provided with at least one circumferentially and continuously extending main groove, at least one circumferentially and continuously extending sub groove, and a plurality of lateral grooves to form circumferentially repeated pitch elements each of which consists of one lateral groove and a block element divided between two adjacent lateral grooves;

the sub groove comprising a continuous sub groove shallow bottom part having a depth smaller than that of the at least one main groove, the sub groove shallow bottom part provided with a sub groove bottom sipe extending along the sub groove, wherein the sub groove shallow bottom part comprises a first shallow part and a second shallow part having a depth deeper than that of the first shallow part; and the plurality of lateral grooves comprising a lateral groove shallow bottom part having a depth smaller than that of the at least one main groove, the lateral groove shallow bottom part provided with a lateral groove bottom sipe extending along the respective lateral groove, the lateral grooves having groove widths W2 in a range of from 5% to 15% in relation to a circumferential length L1 of each pitch element, wherein the sub groove is configured to a zigzag form that comprising a short inclined element and a long inclined element that is inclined in an opposite direction to the short inclined element and has a circumferential length larger than that of the short inclined element, the first shallow part is disposed on the short inclined element, and the second shallow part is disposed on the long inclined element.

* * * * *